United States Patent [19]
Broome et al.

[11] Patent Number: 6,072,634
[45] Date of Patent: Jun. 6, 2000

[54] COMPACT DIGITAL CAMERA OBJECTIVE WITH INTERDIGITATED ELEMENT ALIGNMENT, STRAY LIGHT SUPPRESSION, AND ANTI-ALIASING FEATURES

[75] Inventors: Barry G. Broome, Carlsbad; David M. Hasenauer, Monrovia, both of Calif.; Jon K. Nisper, Tucson; Michael D. Aitchison, Scottsdale, both of Ariz.

[73] Assignee: Intel Corporation, Santa Clara, Calif.

[21] Appl. No.: 08/980,658

[22] Filed: Dec. 1, 1997

[51] Int. Cl.[7] .............................. G02B 27/14; G02B 27/10
[52] U.S. Cl. ........................... 359/637; 359/627; 359/635
[58] Field of Search .................................. 359/637, 627, 359/635

[56] References Cited

U.S. PATENT DOCUMENTS 5,044,706  9/1991  Chen ........................................ 359/357
5,235,465  8/1993  Hayashi ................................... 359/659
5,539,581  7/1996  Sato ........................................ 359/676

*Primary Examiner*—Georgia Epps
*Assistant Examiner*—Michael A Lucas
*Attorney, Agent, or Firm*—Blakely, Sokoloff, Taylor & Zafman LLP

[57] ABSTRACT

There is disclosed a compact lens system having four injection-molded singlet lens elements with one of the singlet lens elements having a diffractive optical surface to control axial chromatic aberrations and another of the singlet lens elements having a flint-like plastic material to control lateral chromatic aberration. The lens system includes interdigitated flange features which provides interdigitated alignment between the lens elements. A plurality of light suppression elements are used to suppress stray light paths from reaching a detector array of the lens system. Moreover, the lens system includes an anti-aliasing surface on one of the lens elements for controlling aliasing effects.

43 Claims, 2 Drawing Sheets

COMPACT DIGITAL CAMERA OBJECTIVE WITH INTERDIGITATED ELEMENT ALIGNMENT, STRAY LIGHT SUPPRESSION, AND ANTI-ALIASING FEATURES

BACKGROUND OF THE INVENTION

1. Field of the Invention

The present invention relates generally to the field of lens systems, and specifically, to a compact digital camera objective having interdigitated element alignment, stray light suppression, and anti-aliasing features.

2. Background Information

Prior art complex lens systems with a f/2.0 relative aperture and a 50 degrees field of view that cover color applications (e.g., white light applications, visual applications, film applications, etc.) typically require six lens elements in high index optical glasses with doublet construction in at least two groups of lens elements to provide control of (axial and lateral) chromatic aberrations. Chromatic aberrations are typically severe for plastic lenses and there are only a limited number of materials to choose from. The doublet construction typically includes a positive lens element that has a low dispersion material (e.g., crown) and a negative lens element that has a high dispersion material (e.g., flint) coupled together. However, the disadvantage with prior art lens systems is that the doublet construction in the two groups of lens elements requires two extra lens elements which is very expensive to produce. Moreover, a lens system with six lens elements cannot be made as compact as a lens system with four lens elements.

Accordingly, there is a need in the art for a method and apparatus to provide a complex lens system that is compact and inexpensive while correcting chromatic and all other optical aberrations.

In addition, complex lens systems that operate in the f/2.0 relative aperture, 50 degree full field diagonal and have a small imaging device format (e.g., less than an 8.0 mm diagonal) require very sensitive fabrication and assembly tolerances for acceptable "as-built", image quality. The prior art lens systems typically align lens elements by using spacers. The disadvantage with using spacers is that they add to the cost of the lens system and require a high degree of accuracy in assembly of the lens system.

Therefore, there is a further need in the technology to provide interdigitated alignment between lens elements without the need for extra parts while facilitating construction of the lens system. There is also a need to suppress stray light from reaching a detector array in a lens system that includes interdigitated single piece lens elements having an optical portion and a non-optical mechanical flange portion.

A further problem with optical systems that form images on detector arrays (e.g., a charge-coupled detector, "CCD") and discretely sample images is that they produce aliasing effects in the displayed image. An example of aliasing effects is Moiré effects which occur when objects move, change patterns, and/or change color relative to the detector array and have dimensions commensurate with the pixel dimensions of the detector array. One solution for eliminating or minimizing aliasing effects is to add a quartz plate in front of the detector array. The quartz plate blurs and reduces the sharpness of the image just the right amount to minimize such aliasing effects. However, quartz plates are very expensive, virtually costing as much as the lens system.

It is therefore desirable to provide an optical lens system that eliminates aliasing effects while maintaining a low cost.

SUMMARY OF THE INVENTION

In one embodiment, the present invention is a lens system. The lens system includes a first lens element having a diffractive surface disposed on one surface to correct axial chromatic aberrations of light passing therethrough. The lens system further includes a second lens element having a flint-like material to correct lateral chromatic aberrations of light passing therethrough.

BRIEF DESCRIPTION OF THE DRAWINGS

The features and advantages of the present invention will become apparent from the following detailed description of the present invention in which.

DESCRIPTION OF THE PREFERRED EMBODIMENT

In the preferred embodiment, the present invention is a method and apparatus for providing a compact digital camera objective having, at most, four lens elements with one lens element having a diffractive surface and another lens element made out of flint-like material to correct axial and lateral chromatic aberrations. The present invention further provides interdigitated lens element alignment, stray light suppression, and anti-aliasing features. The compact digital camera objective may be used with any imaging system (e.g., cameras, camcorders, video conferencing imagers, etc.) that have isolated pixelated detectors such as, but not limited or restricted to, a charge coupled device ("CCD"), a charge injection device ("CID"), or a complementary metal oxide semiconductor ("CMOS") device.

In the following description, for purposes of explanation, numerous details are set forth in order to provide a thorough understanding of the present invention. However, it will be apparent to one skilled in the art that these specific details are not required in order to practice the present invention.

Figure 1:
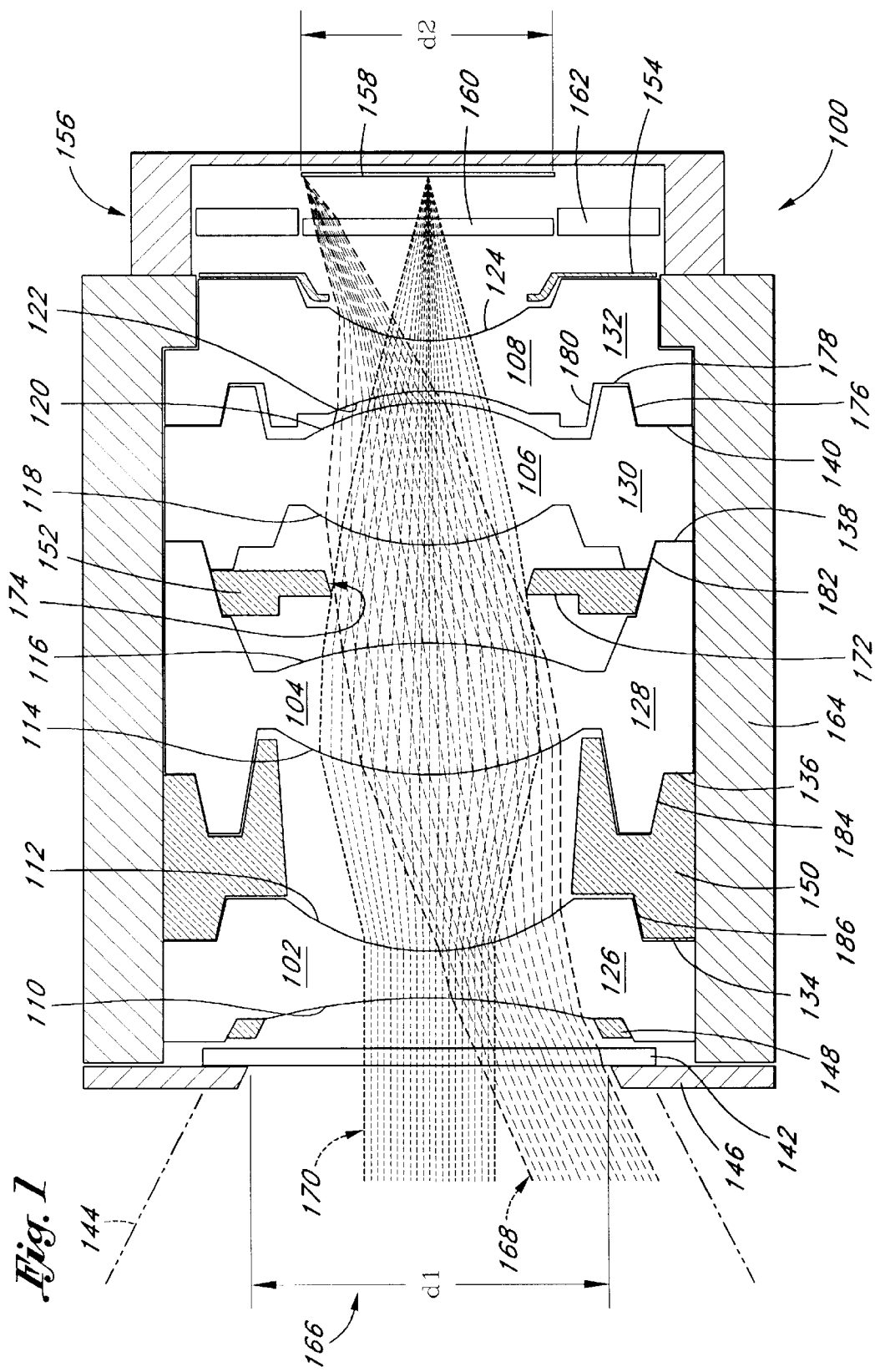
FIG. 1 illustrates a cross section of a lens system of the present invention.

FIG. 1 illustrates a cross section of a lens system 100 of the present invention. Referring to FIG. 1, the lens system 100 includes a first lens element 102 (also referred to as an objective lens element) having first and second surfaces 110 and 112, a second lens element 104 having first and second surfaces 114 and 116, a third lens element 106 having first and second surfaces 118 and 120, and a fourth lens element 108 having first and second surfaces 122 and 124. The lens elements are enclosed in a housing 164 (or lens cell). The first lens element 102 is closest to the object side while the fourth lens element 108 is closest to an imaging device. The first lens element 102 is a negative lens element and is used to increase (or modify) the field of view of the lens system 100. The second lens element 104 is a positive lens element having an aspheric first surface 114 (e.g., an eighth order asphere). The third lens element 106 is a positive lens element and adds focusing power to the lens system 100. The fourth lens element 108 is a negative lens element and has an aspheric first surface 122 (e.g., a sixth order asphere). All of the lens elements 102, 104, 106, and 108 are injection molded plastic singlet lens elements.

To correct axial chromatic aberrations, one of the lens elements of the lens system 100 has a diffractive surface. In a preferred embodiment, the diffractive surface is on the second surface 116 of the second lens element 104. However, it is contemplated that the diffractive surface may be placed on another surface such as, but not limited or restricted to, the first surface 118 of the third lens element 106.

Figure 2A:
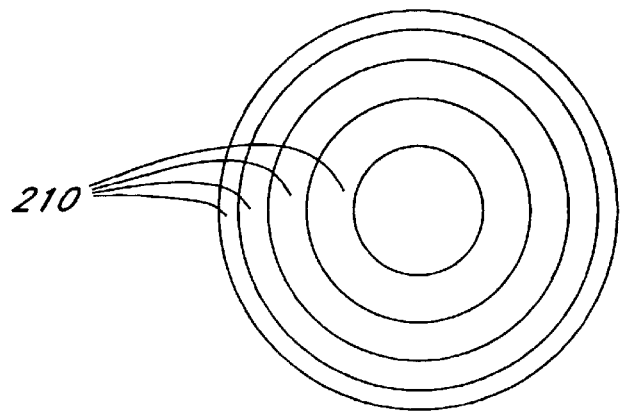
FIG. 2A illustrates a front view of the diffractive surface of the present invention.

FIG. 2A illustrates a front view of the diffractive surface of the present invention. Referring to FIG. 2A, the diffractive surface includes a plurality of rings 210 that are concentric from the center of an aperture. The rings 210 at the center of the surface are widely spaced apart and as the surface is traversed from the center, the rings are more and more closely spaced together.

Figure 2B:
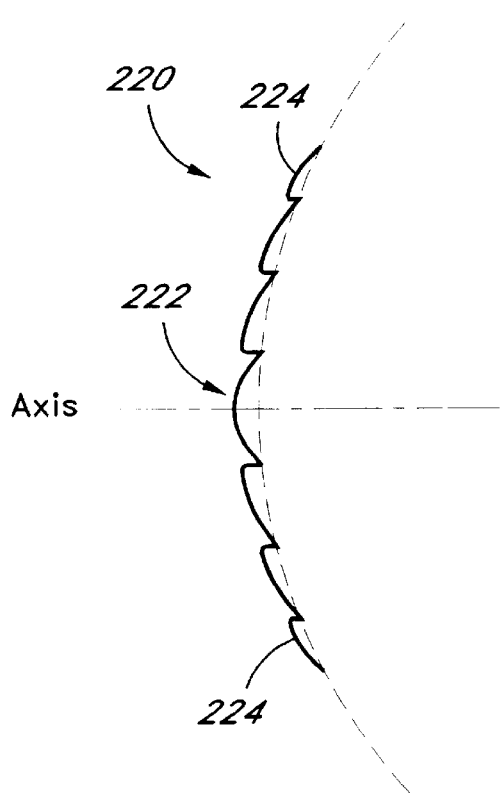
FIG. 2B illustrates a side view of the diffractive surface of the present invention.

FIG. 2B illustrates a side view of the diffractive surface 220. As shown in FIG. 2B, the diffractive surface 220 includes a center zone 222 and successive annular zones 224. In the embodiment shown, the diffractive surface 220 adds strong negative axial chromatic aberration which offsets the positive axial chromatic aberration of the remainder of the optical surfaces. That is, with the diffractive surface, flint elements used in a doublet construction of the prior art lens systems are no longer required.

Referring back to FIG. 1, since the diffractive surface 116 is close to an aperture stop 152, it only operates on the axial chromatic aberrations. In order to correct lateral chromatic aberrations, the lens system 100 uses a flint-like lens element. Typically, the flint-like lens element is placed close to the image or close to the object.

In the preferred embodiment, the fourth lens element 108 is made out of flint-like material (e.g., SAN, NAS, polycarbonate, styrene, etc.) and the first, second, and third lens elements 102, 104, and 106 are made out of crown-like material (e.g., acrylic, cyclic olefin co-polymer "COC", etc.). The specific configuration of the lens system 100 of FIG. 1, i.e., the combination of the diffractive optical surface 116 and the flint-like fourth lens element 108, corrects chromatic (axial and lateral) aberrations. In another embodiment, the first lens element 102 is made out of flint-like material and the second, third, and fourth lens elements 104, 106, and 108 are made out of crown-like material. The compact form of the lens system 100 is a direct result of the reduction of the six lens element (or more) configuration of the prior art lens systems to a four lens element configuration of the present invention.

On the object side of the first lens element 102 is an opening 166 that provides the optical pathway to the lens system 100. The diameter of the opening 166 is shown by distance d1, and in one embodiment, is 14.5 millimeters ("mm"). Moreover, in one embodiment, the lens system 100 has a relative aperture of f/2.0 with a 50 degrees full field diagonal. However, it is to be appreciated that the lens system of the present invention may be designed to have a different relative aperture (e.g., f/1.6) and a different size field of view (e.g., 35 degrees). A glass window 142 is incorporated within the lens cell 164 on the object side of the first lens element 102 to protect the lens system 100 from the environment.

On the second side 124 of the fourth lens element 108 is an imaging device 156 having an image plane 158 (hereinafter referred to as a detector array). The diameter of the detector array 158 is shown by distance d2 and, in one embodiment, is 8 mm. The imaging device 156 may be a CCD, CID, or CMOS detector array, to name a few. In front of the detector array 158 is a glass plate 160. The detector array 158 and the glass plate 160 are incorporated in a case 162. Light rays, such as light ray bundles 168 and 170 enter the lens system 100 through the opening 166, propagate through the four lens elements, and onto the detector array 158. The detector array 158 generates signals that represent an image formed by the light rays.

The four lens elements 102, 104, 106, and 108 have minimal airspace between them in order to force a compact design and also to permit alignment between the lens elements. Because the imaging device 156 is small, the focal length of the lens system 100 is short, and all four lens elements are small. Small lens elements require very small fabrication and assembly tolerances to maintain the "as-built" image quality. By way of example, if two lens elements are each four inches in diameter, a centration error of approximately 0.005 inches represents a small tolerance error and the impact on the image quality is negligible. On the other hand, if two lens elements are each approximately 0.20 inches in diameter (typical values for this invention), a centration error of approximately 0.005 inches is a substantial tolerance error, yielding a totally unacceptable image quality. The latter example has at least twenty times the affect on image quality that would be present using four inch diameter lens elements. In one embodiment, the tolerances for the lens system 100 of the present invention are approximately on the order of 0.0005 to 0.0008 inches. Accordingly, it is critical to force alignment between the lens elements.

Continuing to refer to FIG. 1, each of the lens elements is injection molded into a single part. During fabrication of the mold, the entire surface of each lens element is diamond turned in one setup. Each lens element has an optical portion designated by numerals 102, 104, 106, and 108 and a mechanical flange portion (also referred to as an alignment finger) designated as numerals 126, 128, 130, and 132, respectively, which serves as the mechanical alignment function of the lens element. The mechanical flanges of adjacent lens elements interdigitate, i.e., form a substantially perfect fit or alignment, in order to capture each lens element and its neighbor with one or more alignment surfaces. That is, each pair of adjacent lens elements are pushed together until they come into intimate contact and there is no clearance in-between.

In the embodiment of FIG. 1, the mechanical flange 132 of the fourth lens element 108 interdigitates with the mechanical flange 130 of the third lens element 106 at only two surfaces, as shown by numerals 140 and 176. The first surface 140 sets the separation between the third and fourth lens elements 106 and 108. The second surface 176 sets the centration of the two lens elements. The other two surfaces, designated by numerals 178 and 180, are clear and do not touch. If any of these surfaces touch, it can cause an over-constrained condition which stresses the lens elements, causing the optical surfaces to distort images.

Similarly, the mechanical flange 130 of the third lens element 106 interdigitates with the mechanical flange 128 of the second lens element 104 at surfaces 138 and 182. The mechanical flanges 128 and 130 of the second and third lens elements interdigitate with an aperture stop 152. As will be apparent by the description below, the first and second lens elements 102 and 104 are not directly interdigitated together. Rather, the mechanical flanges 128 of the second lens element 104 interdigitates with an opaque spacer 150 at surfaces 136 and 184. Similarly, the mechanical flange 126 of the first lens element 102 interdigitates with the opaque separator 150 at surfaces 134 and 186. Surfaces 134 and 136 set the separation between the first and second lens elements 102 and 104 and the opaque separator 150. Moreover, the surfaces 184 and 186 set the centration of the first and second lens elements 102 and 104. The opaque spacer 150 serves as a stray light suppression element. As discussed above, each pair of adjacent lens elements or a lens element and the adjacent opaque spacer 150 interdigitate at only two surfaces, as designated.

The mechanical flange 126 of the first lens element 102 has the property of allowing light that enters it to propagate in an uncontrolled manner through the mechanical flanges of the other lens elements and eventually become dispersed across the detector array 158. This uncontrolled stray light on the detector array 158 causes unwanted bright artifacts localized at various points in the detector array which in turn causes a general loss of contrast across the entire detector array. This effect is dramatic and makes the lens system useless if the stray light is not effectively suppressed.

Accordingly, the lens system 100 of the present invention comprises a plurality of light suppression elements for suppressing stray light that may propagate through the mechanical flanges of the lens elements and onto the detector array 158. The first light suppression element is a lens shroud 144 which is coupled to and projects forward from the front of the lens cell 164 and limits the field of view. In the preferred embodiment, the lens shroud 144 limits the full field of view to 50 degrees diagonal. Moreover, in one embodiment, the lens shroud 144 is a conical baffle which serves the function of preventing sun light, when it is outside the used field of view, from illuminating the glass window 142 or the first lens element 102. If these optical surfaces are illuminated and have micro-scratches or dust, they will scatter sun light onto the detector array 158. The lens shroud 144 may be made as long as the cosmetic requirements of the objective lens permits. The internal surface of the lens shroud 144 (not shown) is typically a cone with slightly greater included angle than the full field diagonal of the lens field of view.

The second light suppression element is a light baffle surface 146 located on the front of the lens system 100 and projects over most of the mechanical flange 126 (i.e., the non-optical portion) of the first lens element 102. The third light suppression element is a compressible foam seal 148 which projects over the remaining exposed portion of the mechanical flange 126 of the first lens element 102. The compressible foam seal 148 also serves to seal the lens system from the environment while forcing the four lens elements (102, 104, 106, 108 including opaque spacer 150) into intimate contact.

The fourth light suppression element is the opaque black spacer 150 which is interdigitated between the mechanical flanges 126 and 128 of the first and second lens elements 102 and 104, respectively. The opaque black spacer 150 absorbs stray light which may enter the lens system 100 through the mechanical flange 126 of the first lens element 102 and subsequently propagate through the mechanical flange 128 of the second lens element 104. In one embodiment, the internal surface of the opaque black spacer 150 is either diffused or has micro grooves to prevent specular reflection of light into the rest of the lens system 100.

The fifth light suppression element is an aperture stop 152. The aperture stop 152 is placed near the second surface 116 of the second lens element 104 and defines the optical pathway of the bundle of light rays. It is made of opaque black material to suppress much of the stray light. The aperture stop 152 structure prevents light that enters from the front of the lens system from reaching the mechanical flanges (i.e., the non-optical portions) 130 and 132 of the third and fourth lens elements 106 and 108. In the preferred embodiment, the front surface 172 of the aperture stop 152 is in a rough diffused condition. The aperture stop 152 includes an inner surface 174 which is also left in a diffused condition. In the preferred embodiment, the inner surface 174 is a V-blade cross-section to eliminate flat specular surfaces that could reflect light toward the detector array 158. The sixth light suppression element is an opaque black baffle 154 which is placed adjacent to the mechanical flange 132 of the fourth lens element 108. The baffle 154 prevents stray light, which has been diffusely or multiply scattered by other structures, from reaching the detector array 158.

Figure 3:
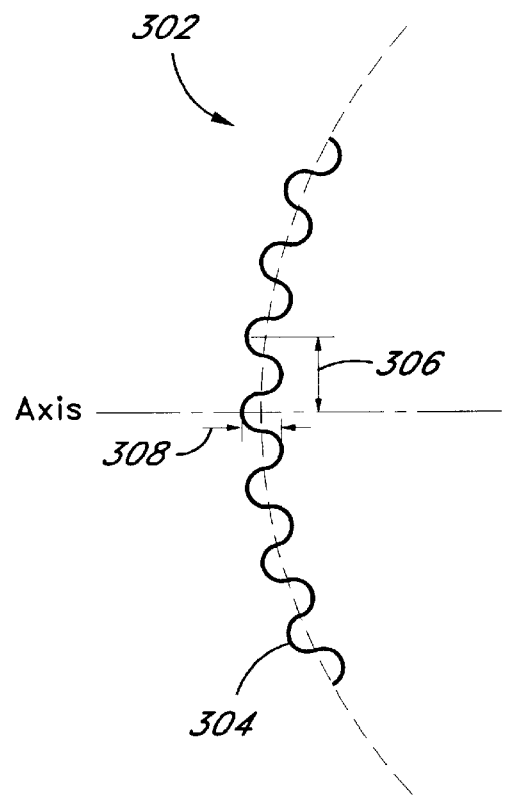
FIG. 3 illustrates an expanded side view of a lens element anti-alias surface of the present invention.

The lens system 100 of the present invention further includes an antialiasing feature for eliminating aliasing effects that occur when an object moves relative to the detector array 158 and has dimensions commensurate with the pixel dimensions of the detector array 158. FIG. 3 illustrates an expanded side view of a lens element anti-alias surface 302 of the present invention. Referring to FIG. 3, the lens element surface 302 includes a radially-symmetric periodic "cosine-like" surface 304 molded on the lens element surface 302. The periodic surface 302 (or microscopic ripple) causes the image of a point to be spread in a controlled manner.

In the preferred embodiment, the lens element surface 302 is the first surface 118 of the third lens element 106 of FIG. 1. The period 306 and depth 308 of the rippled surface are carefully selected and optimized to control the size of the blur and the rate at which energy is distributed. In one embodiment, the radially-symmetric cosine ripple has a constant amplitude and at least two periods across the semi-diameter of the aperture stop 152 of FIG. 1. In a second embodiment, the cosine ripple has a monotonically decreasing amplitude across the aperture. In a third embodiment, the cosine ripple has a monotonically changing period across the aperture. In yet a fourth embodiment, the cosine ripple has both a monotonically decreasing amplitude and changing period across the aperture. The cosine ripple is created on a tool, typically made out of stainless steel. The lens element is then injection molded with hot plastic which forms the ripple on the surface. In another embodiment, the lens element surface 302 includes a "puckered" structure that has a two-dimensional array of elevated "bumps" which cause the image to become blurred in a controlled manner. These type of anti-aliasing features are insensitive to the relative aperture and the object distance.

In the preferred embodiment, the lens system of the present invention achieves a fast relative aperture (f/2.0) and a moderately large field of view of 50 degrees using four lens elements in a very compact form. Prior art lens systems with the same relative aperture and field of view require six lens elements using high index optical glasses which are very expensive to produce. The lens elements are each injection molded into single pieces and are interdigitated to provide optical alignment of the lens system. A plurality of light suppression features are provided to suppress and prevent stray light from entering the mechanical flange portions of the lens elements and dispersing onto the detector array. In addition, a cosine-like structure or a "puckered" structure is molded on a lens element surface to minimize aliasing effects (e.g., Moiré effects).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A lens system comprising:
   a detector array;
   a first lens element made of crown-like material and located in front of the detector array, the first lens element including a diffractive surface;
   a second lens element made of a flint-like material and located in front of the detector array; and
   third and fourth lens elements made of crown-like material and located in front of the detector array,
   said first through fourth lens elements to correct axial and lateral chromatic aberration of light passing through the lens elements and falling on the detector array.

2. The lens system of claim 1 wherein the second lens element is located between the first lens element and the detector array.

3. The lens system of claim 1 wherein the first lens element is located between the second lens element and the detector array.

4. The lens system of claim 3 wherein each of the first, second, third, and fourth lens elements includes a mechanical flange, wherein the mechanical flanges of the first and fourth lens elements interdigitate and the mechanical flanges of the second and fourth lens elements interdigitate.

5. The lens system of claim 4 further comprising an opaque spacer that interdigitates with the mechanical flanges of the first and third lens element.

6. The lens system of claim 1 wherein the flint-like material comprises one of the following: SAN, NAS, polycarbonate, and styrene; and wherein the crown-like material comprises one of the following: acrylic and cyclic olefin copolymer.

7. The lens system of claim 1 further comprising an aperture stop proximate to the diffractive surface of the first lens element.

8. The lens system of claim 7 wherein the lens system has a relative aperture ranging between approximately f/1.6 approximately to f/2.0.

9. The lens system of claim 1 wherein the detector array and the first, second, third, and fourth lens elements are incorporated into a housing having an opening.

10. The lens system of claim 9 further comprising a light baffle surface placed in front of the housing to prevent stray light from entering the mechanical flange of the third lens element.

11. The lens system of claim 9 further comprising a lens shroud placed proximate to the opening of the housing to limit the field of view of the lens system.

12. The lens system of claim 1 wherein the detector array is a complementary metal oxide semiconductor device.

13. The lens system of claim 1 further comprising a baffle placed behind the second lens element, said baffle to prevent stray light from falling on the detector array.

14. The lens system of claim 1 wherein each of the first and second lens elements has an aspheric surface on one of the surfaces.

15. The lens system of claim 1 wherein the fourth lens element includes a periodic surface molded thereon to reduce aliasing effects.

16. The lens system of claim 15 wherein an amount of aliasing is controlled by varying a period and depth of the periodic surface.

17. The lens system of claim 1 wherein each of the first, second, third, and fourth lens elements is injection molded into a single piece having an optical portion and a mechanical alignment portion.

18. The lens system of claim 1 wherein the fourth lens element includes an array of elevated bumps on one surface for controlling aliasing effects.

19. A lens system comprising:
   a housing having an opening, the housing including,
   (a) a first lens element including a first mechanical flange;
   (b) a second lens element including a second mechanical flange;
   (c) an opaque spacer that interdigitates with the first and second mechanical flanges of the first and second lens elements;
   (d) a third lens element including a third mechanical flange that interdigitates with the second mechanical flange of the second lens element; and
   (e) a fourth lens element including a fourth mechanical flange that interdigitates with the third mechanical flange of the third lens element.

20. The lens system of claim 19 wherein each of the first, second, third, and fourth lens elements is injection molded into a single piece having an optical portion and a mechanical alignment portion.

21. The lens system of claim 19 wherein said second lens element includes a diffractive surface disposed on one surface, said first through third lens elements are made from crown-like material, and said fourth lens element is made from flint-like material to correct axial and lateral chromatic aberrations of light passing therethrough.

22. The lens system of claim 19 wherein said third lens element includes a diffractive surface disposed on one surface, said first through third lens elements are made from crown-like material, and said fourth lens element is made from flint-like material to correct axial and lateral chromatic aberrations of light passing therethrough.

23. The lens system of claim 19 wherein the housing further includes an aperture stop between the second and third lens elements.

24. The lens system of claim 19 wherein the housing further includes a glass window and a compressible foam seal placed between the first lens element and the glass window, said compressible foam seal to reduce an amount of stray light from entering the first mechanical flange of the first lens element and alternatively to force alignment between the lens elements.

25. The lens system of claim 19 wherein each of the second and fourth lens elements has an aspheric surface on one of the surfaces.

26. The lens system of claim 19 wherein the housing further includes a detector array placed behind the first, second, third, and fourth lens elements.

27. The lens system of claim 26 wherein the detector array comprises one of the following devices; a complementary metal oxide semiconductor device, a charge coupled device, and a charge injection device.

28. The lens system of claim 26 wherein the third lens element includes a periodic surface molded thereon to reduce aliasing effects.

29. The lens system of claim 28 wherein an amount of aliasing is controlled by varying a period and depth of the periodic surface.

30. The lens system of claim 26 wherein the third lens element includes an array of elevated bumps on one surface for controlling aliasing effects.

31. A camera system having an optical axis, comprising:
   a lens system including,
   a first lens element on the optical axis, the first lens element including a diffractive surface disposed on one surface and made of crown-like material, an aperture stop, a second lens element on the optical axis, the second lens element made of a flint-like material, a third lens element on the optical axis, and made of crown-like material, and a fourth lens element on the optical axis, and made of crown-like material; and a detector array on the optical axis behind the first through fourth lens elements.

32. The camera system of claim 31 wherein said the first through fourth lens elements to correct axial and lateral chromatic aberrations of light passing therethrough.

33. The camera system of claim 31 wherein the first lens element is in front of the second lens element.

34. The camera system of claim 33 wherein the third lens element is in front of the first lens element and the fourth lens element is between the first and second lens elements.

35. The camera system of claim 33 wherein each of the first, second, third, and fourth lens elements include a mechanical flange, wherein the mechanical flanges of the first and fourth lens elements interdigitate and the mechanical flanges of the second and fourth lens elements interdigitate.

36. The camera system of claim 31 wherein the second lens element is in front of the first lens element.

37. The camera system of claim 36 wherein the first lens element is in front of the third and fourth lens elements.

38. The camera system of claim 31 wherein the diffractive surface includes a plurality of concentric rings.

39. The camera system of claim 35 further comprising an opaque spacer that interdigitates with the mechanical flanges of the first and third lens elements.

40. The camera system of claim 31 wherein the lens system has a relative aperture ranging between approximately f/1.6 to approximately f/2.0.

41. The camera system of claim 31 wherein the detector array comprises one of the following devices: a complementary metal oxide semiconductor device, a charge coupled device, and a charge injection device.

42. The camera system of claim 31 wherein the fourth lens element includes a periodic surface molded thereon to reduce aliasing effects.

43. The camera system of claim 31 wherein the fourth lens element includes an array of elevated bumps on one surface for reducing aliasing effects.

* * * * *

UNITED STATES PATENT AND TRADEMARK OFFICE
CERTIFICATE OF CORRECTION

PATENT NO. : 6,072,634
DATED : June 6, 2000
INVENTOR(S) : Broome et al.

It is certified that error appears in the above-identified patent and that said Letters Patent is hereby corrected as shown below:

Column 7,
Line 39, delete "approximately to", insert -- to approximately --.

Column 9,
Line 11, after "said", delete "the".

Signed and Sealed this

Twenty-first Day of January, 2003

JAMES E. ROGAN
*Director of the United States Patent and Trademark Office*